United States Patent
Lim et al.

(10) Patent No.: US 10,257,837 B2
(45) Date of Patent: Apr. 9, 2019

(54) METHOD FOR TRANSMITTING FRAME IN WIRELESS LAN SYSTEM

(71) Applicant: LG ELECTRONICS INC., Seoul (KR)

(72) Inventors: Dongguk Lim, Seoul (KR); Wookbong Lee, Seoul (KR); Hangyu Cho, Seoul (KR); Jinyoung Chun, Seoul (KR); Jinsoo Choi, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 15/508,877

(22) PCT Filed: Apr. 7, 2015

(86) PCT No.: PCT/KR2015/003461
§ 371 (c)(1),
(2) Date: Mar. 3, 2017

(87) PCT Pub. No.: WO2016/056719
PCT Pub. Date: Apr. 14, 2016

(65) Prior Publication Data
US 2017/0223692 A1 Aug. 3, 2017

Related U.S. Application Data (60) Provisional application No. 62/061,156, filed on Oct. 8, 2014, provisional application No. 62/072,432, filed on Oct. 30, 2014.

(51) Int. Cl.
*H04W 4/00* (2018.01)
*H04W 72/04* (2009.01)
(Continued)

(52) U.S. Cl.
CPC ............. *H04W 72/048* (2013.01); *H04L 1/00* (2013.01); *H04L 1/0001* (2013.01);
(Continued)

(58) Field of Classification Search
CPC .......................... H04L 5/0046; H04W 72/048
(Continued)

(56) References Cited

U.S. PATENT DOCUMENTS 8,942,320 B2 * 1/2015 Zhang ................. H04L 27/2613
370/329
9,252,999 B1 * 2/2016 Zhang ................. H04L 25/0204
(Continued)

FOREIGN PATENT DOCUMENTS

EP 2496010 9/2012
WO 2016029874 3/2016

OTHER PUBLICATIONS

PCT International Application No. PCT/KR2015/003461, Written Opinion of the International Searching Authority dated Jul. 14, 2015, 23 pages.
(Continued)

*Primary Examiner* — Thai D Hoang
(74) *Attorney, Agent, or Firm* — Lee Hong Degerman Kang Waimey (57) ABSTRACT

The present invention relates to a method for transmitting a frame in a wireless communication system, in particular, a high density wireless LAN system, and a station apparatus for performing the same. To this end, a station for transmitting a frame configures a radio frame for a second type station, including a frame part for a first type station and a frame part for the second type station, wherein the frame part for the second type station includes a first signaling field (SIG A) for the second type station and a second signaling field (SIG B) for the second type station. The SIG A for the
(Continued)

second type station includes modulation and coding scheme (MCS) information applied to the SIG B for the second type station, and the MCS level applied to the SIG B for the second type station supports an MCS having level than the lowest MCS level defined for the first type station.

10 Claims, 8 Drawing Sheets (51) Int. Cl.
H04L 1/00 (2006.01)
H04L 27/26 (2006.01)
H04L 5/00 (2006.01)
H04W 84/12 (2009.01)

(52) U.S. Cl.
CPC .......... *H04L 1/0003* (2013.01); *H04L 5/0046* (2013.01); *H04L 27/26* (2013.01); *H04W 84/12* (2013.01)

(58) Field of Classification Search
USPC ............... 370/329–330, 335–345, 347–349; 455/450–454
See application file for complete search history.

(56) References Cited

U.S. PATENT DOCUMENTS

| | | |
|---|---|---|
| 2012/0177144 A1 | 7/2012 | Lee et al. |
| 2012/0224612 A1 | 9/2012 | Kim et al. |
| 2012/0269123 A1 | 10/2012 | Porat et al. |
| 2012/0269142 A1* | 10/2012 | Porat ................. H04W 72/1231 370/329 |
| 2013/0044743 A1* | 2/2013 | Zhang ................. H04W 28/18 370/338 |
| 2013/0121243 A1* | 5/2013 | Vermani ............... H04L 1/0029 370/328 |
| 2013/0128806 A1 | 5/2013 | Vermani et al. |
| 2013/0188572 A1 | 7/2013 | Cheong et al. |
| 2013/0235836 A1 | 9/2013 | Roh et al. |
| 2015/0172026 A1* | 6/2015 | Zhang ................. H04L 5/0048 370/329 |
| 2016/0050659 A1* | 2/2016 | Seok ................... H04L 1/0003 370/338 |
| 2016/0150514 A1* | 5/2016 | Kwon ............... H04W 74/0816 370/329 |
| 2016/0156438 A1* | 6/2016 | Sun .................... H04L 27/2602 370/330 |
| 2016/0204915 A1* | 7/2016 | Chen ................... H04L 1/0061 370/329 |
| 2017/0238286 A1* | 8/2017 | Chun .................. H04W 72/042 370/329 |

OTHER PUBLICATIONS

European Patent Office Application Serial No. 15848707.4, Search Report dated May 4, 2018, 7 pages.

* cited by examiner

| L-STF | L-LTF | L-SIG | HE-SIG A | | | | |
|---|---|---|---|---|---|---|---|
| L-STF | L-LTF | L-SIG | HE-SIG A | HE-STF | HE-LTF | HE-SIG B | Data |
| L-STF | L-LTF | L-SIG | HE-SIG A | | | | |
| L-STF | L-LTF | L-SIG | HE-SIG A | | | | |

Fig. 7

| L-STF | L-LTF | L-SIG | HE-SIG A | | | | |
|---|---|---|---|---|---|---|---|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

Fig. 8

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

Fig. 9

| L-STF | L-LTF | L-SIG | HE-SIG A | HE-SIG B | HE-STF | HE-LTF | Data for STA 1 |
|---|---|---|---|---|---|---|---|
| L-STF | L-LTF | L-SIG | HE-SIG A | HE-SIG B | HE-STF | HE-LTF | Data for STA 2 |
| L-STF | L-LTF | L-SIG | HE-SIG A | HE-SIG B | HE-STF | HE-LTF | Data for STA 3 |
| L-STF | L-LTF | L-SIG | HE-SIG A | HE-SIG B | HE-STF | HE-LTF | Data for STA 4 |

METHOD FOR TRANSMITTING FRAME IN WIRELESS LAN SYSTEM

CROSS-REFERENCE TO RELATED APPLICATIONS

This application is the National Stage filing under 35 U.S.C. 371 of International Application No. PCT/KR2015/003461, filed on Apr. 7, 2015, which claims the benefit of U.S. Provisional Application No. 62/061,156, filed on Oct. 8, 2014 and 62/072,432, filed on Oct. 30, 2014, the contents of which are all hereby incorporated by reference herein in their entirety.

TECHNICAL FIELD

The present invention relates to a wireless communication system, and more particularly, to a method for transmitting a frame in a high-density wireless local area network (WLAN) system and station device for performing the same.

BACKGROUND ART

First of all, a wireless local area network (WLAN) system is described as an example of the system to which the present invention can be applied.

Standards for a wireless local area network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying multiple input multiple output (MIMO)-OFDM. In IEEE 802.11n, a channel bandwidth is supported up to 40 MHz and in this case, a transmission rate of 600 Mbps is provided.

The above-described WLAN standards have evolved into IEEE 802.11ac standards that provides a bandwidth of up to 160 MHz and a transmission rate of up to 1 Gbit/s by supporting eight spatial streams. Currently, IEEE 802.11ax standards are under discussion.

DISCLOSURE OF THE INVENTION

Technical Task

In the above-mentioned IEEE 802.11ax standards, a new frame structure is under discussion to implement high-speed wireless communication in a high-density wireless environment.

In particular, since in the new frame structure, a frame portion for a legacy terminal coexists with a frame portion for a terminal supporting IEEE 802.11ax, additional discussion on how to configure and transmit a preamble for the IEEE 802.11ax terminal is required.

Technical Solutions

In one aspect of the present invention, provided is a method for transmitting a frame by a first station in a wireless local area network (WLAN) system, including: configuring a radio frame for a second type of station including a frame portion for a first type of station and a frame portion for the second type of station; and, wherein the frame portion for the second type of station may include a first signaling field (SIG A) for the second type of station and a second signaling field (SIG B) for the second type of station, wherein the SIG A for the second type of station may include information on a modulation and coding scheme (MCS) applied to the SIG B for the second type of station, and wherein an MCS level applied to the SIG B for the second type of station may support an MCS level lower than a lowest MCS level defined for the first type of station, transmitting the configured radio frame for the second type of station to a second station. In this case, the first station and the second station may be a second type of terminal.

The radio frame for the second type of station may further include a data field and the MCS level applied to the SIG B for the second type of station may be determined in consideration of an MCS level applied to the data field.

Preferably, the MCS level applied to the SIG B for the second type of station may be determined to be equal to or lower than the MCS level applied to the data field.

The MCS level lower than the lowest MCS level defined for the first type of station may be implemented by repeating the SIG B for the second type of station.

Meanwhile, even an MCS level applied to the SIG A for the second type of station may support the MCS level lower than the lowest MCS level defined for the first type of station. The MCS level lower than the lowest MCS level defined for the first type of station may be implemented by repeating the SIG A for the second type of station.

In the above description, signal repetition may be performed by repeating a signal that constitutes at least one of the SIG A for the second type of station and the SIG B for the second type of station N times in unit of n bits where N and n are positive integer equal to or greater than 2.

At least one of interleaving and scrambling may be performed on the N times repeated signal.

In the above description, the SIG A for the second type of station may provide common control information and the SIG B for the second type of station may provide user-specific control information required for data transmission. In addition, the second type of terminal may be a terminal that supports communication schemes in accordance with IEEE 802.11ax standards and a first type of terminal may be a legacy terminal. In this case, the legacy terminal may mean an IEEE 802.11a terminal.

In another aspect of the present invention, provided is a station device operating as a first station in a wireless local area network (WLAN) system, including: a processor configured to configure a radio frame for a second type of station including a frame portion for a first type of station and a frame portion for the second type of station; and a transmitter configured to transmit the radio frame for the second type of station configured by the processor, wherein the frame portion for the second type of station may include a first signaling field (SIG A) for the second type of station and a second signaling field (SIG B) for the second type of station, and wherein the processor may configure the SIG A for the second type of station to indicate information on a modulation and coding scheme (MCS) applied to the SIG B for the second type of station and an MCS level applied to the SIG B for the second type of station to support an MCS level lower than a lowest MCS level defined for the first type of station.

The processor may configure even an MCS level applied to the SIG A for the second type of station to support the MCS level lower than the lowest MCS level defined for the first type of station.

In addition, the processor may include a channel coder, an interleaver, a modulator, and an IFFT module and the processor may further include a repeater for repeating an input signal to support the MCS level lower than the lowest MCS level defined for the first type of station.

After receiving a signal outputted from the modulator, the repeater may repeat an entirety of the signal or a predetermined number of bits of the signal N times where N is a positive integer equal to or greater than 2.

The processor may further include a means for performing scrambling or interleaving on the signal repeated by the repeater.

Advantageous Effects

According to the present invention, it is possible to operate a frame that not only allows high-efficiency wireless communication but also minimize effects on the existing standard technology.

Specifically, SIG B of a frame portion in accordance with the newly defined WLAN standards can be transmitted based on an MCS level lower than the lowest MCS level among existing MCS levels, whereby transmission efficiency can be improved.

BEST MODE FOR INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

The following description relates to a method for transmitting a preamble in a WLAN system and station device for performing the same. To this end, the WLAN system to which the present invention can be applied will be explained in detail.

Figure 1:
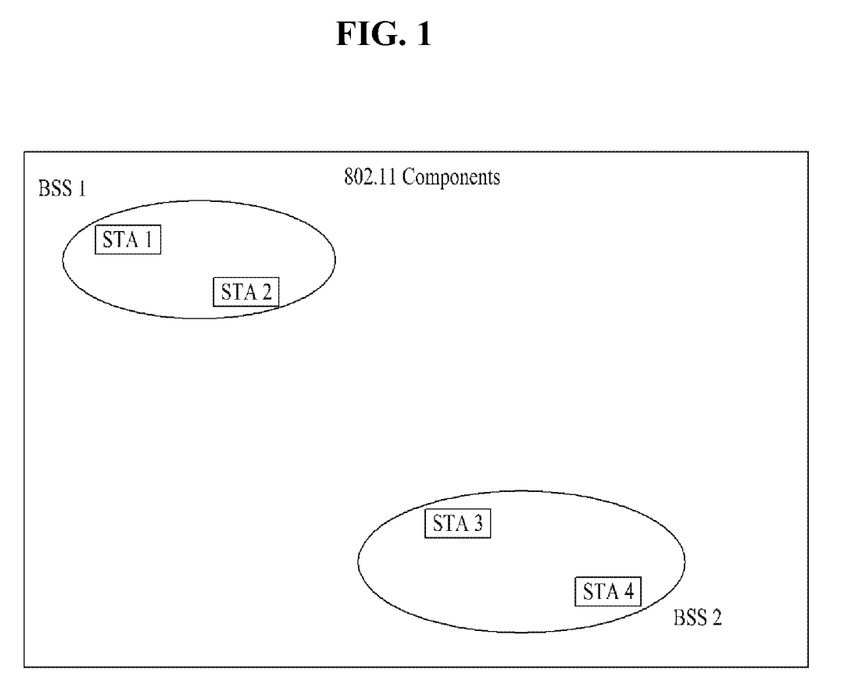
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS S).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
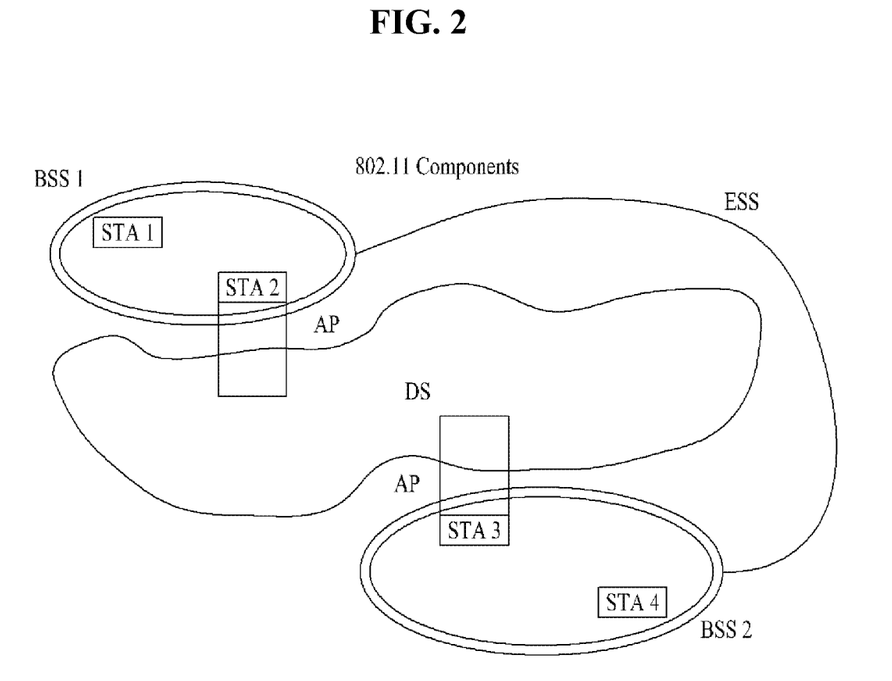
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above discussion, a frame structure that can be used in the WLAN system will be described.

Figure 3:
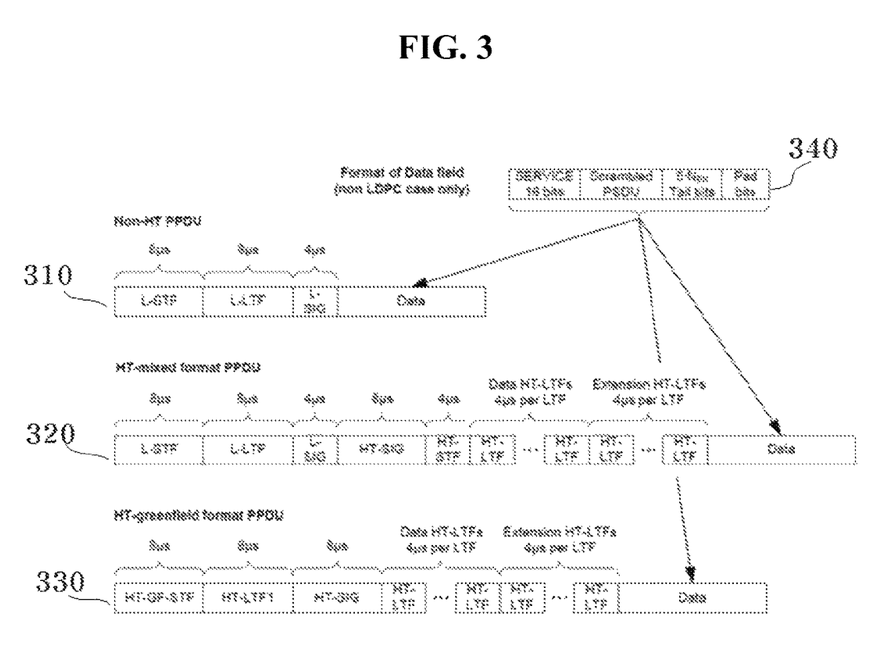
FIG. 3 is a diagram for explaining a frame structure that can be used in a WLAN system.

FIG. 3 is a diagram for explaining the frame structure that can be used in the WLAN system.

Specifically, in FIG. 3, reference numeral 310 denotes a physical layer protocol data unit (PPDU) format for a terminal in accordance with IEEE 802.11a/g standards and reference numerals 320 and 330 denote PPDU formats for a terminal in accordance with IEEE 802.11n standards. As shown in FIG. 3, a terminal supporting IEEE 802.11n schemes uses frames denoted by a prefix of "HT-".

More specifically, the reference numeral 320 denotes an HT-mixed format PPDU of the IEEE 802.11n terminal and the reference numeral 330 denotes an HT-greenfield format PPDU of the IEEE 802.11n terminal.

In addition, reference numeral 340 denotes a configuration of data in each PPDU and a physical service data unit (PSDU) is included in a data region.

Figure 4:
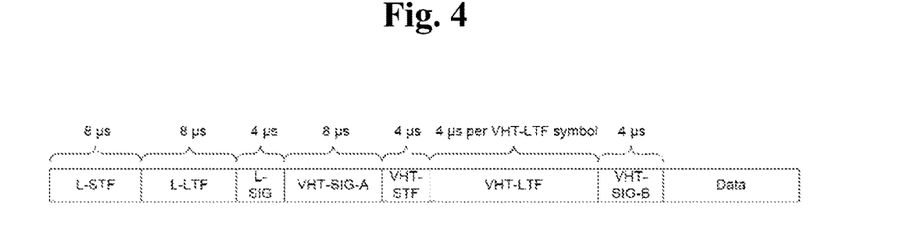
FIG. 4 illustrates a frame format according to an IEEE 802.11ac standard technology.

FIG. 4 illustrates the frame format according to the IEEE 802.11ac standard technology.

As shown in FIG. 4, a terminal in accordance with IEEE 802.11ac standards supports fields denoted by a prefix of "VHT-".

Details of individual fields illustrated in FIG. 4 are summarized in Table 1 below.

TABLE 1

| Field | Description |
| --- | --- |
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

Figure 5:
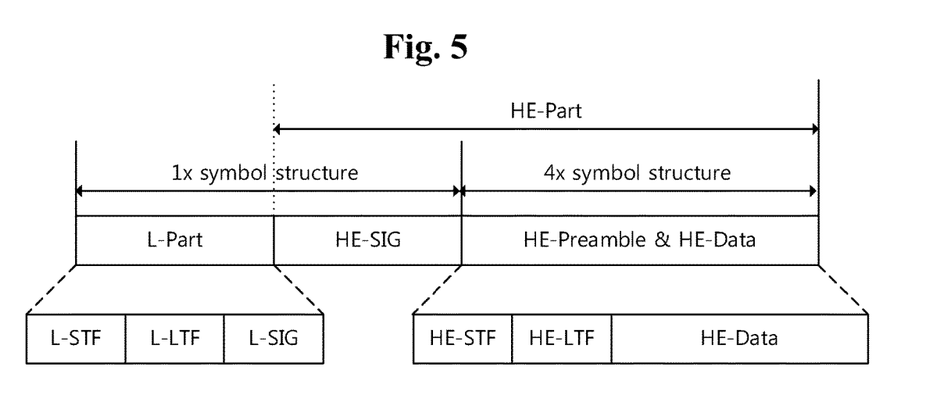
FIG. 5 is a diagram illustrating a frame format available in a new standards as an embodiment of the present invention.

FIG. 5 is a diagram illustrating a frame format available in a new standards as an embodiment of the present invention.

In FIG. 5, "L-Part" indicates a frame portion for a legacy terminal (i.e., a frame portion for a first type of terminal), and "HE-Part" indicates a frame portion for a terminal in accordance with an enhanced standard technology (e.g., IEEE 802.11ax) (i.e., a frame portion for a second type of terminal). In this case, it is preferred that the frame portion in accordance with the new standards has a length greater by an integer multiple than that of the frame portion for the legacy terminal in a time domain. FIG. 5 shows an example of the frame structure in the 802.11ax where a conventional 1× symbol structure (i.e., 3.2 us) is maintained until an HE-SIG, whereas a 4× symbol structure (i.e., 12.8 us) is used for an HE-preamble and data.

In the case of the "L-Part" in the example of FIG. 5, an L-STF, L-LTF, and L-SIG can be maintained similar to a configuration of the conventional Wi-Fi system as illustrated in FIG. 3 and FIG. 4.

The newly defined HE-SIG in the HE-Part may have fields for indicating common control information and user-specific information. As illustrated in FIG. 5, the 1× symbol structure is used in the HE-SIG similar to the L-Part. On the other hand, since the 4× symbol structure is used in the HE-preamble and data, a frequency tone (FT) that can be used per bandwidth is increased by four times compared to the conventional Wi-Fi system. In addition, the number of available tones may also be changed. Therefore, the HE-preamble (HE-STF and HE-LTF) can be newly designed to support the increased FT and the changed available tones.

Hereinafter, a description will be given of a method for efficiently configuring and transmitting the HE-Part based on the above-mentioned design.

Figure 6:
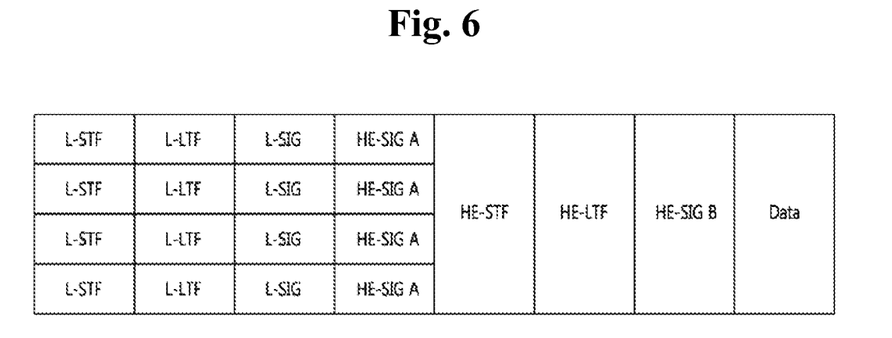
FIG. 6 is a diagram for explaining a frame configuration method according to an embodiment of the present invention.

FIG. 6 is a diagram for explaining a frame configuration method according to an embodiment of the present invention.

According to the PPDU format illustrated in FIG. 6, a PPDU for a single STA is transmitted in a total of an 80-MHz bandwidth through four 20 MHz channels. However, a PPDU can be transmitted through each of the four 20 MHz channels and thus the four 20 MHz channels may carry PPDUs for different STAs, respectively.

The L-STF, L-LTF, and L-SIG may be transmitted in an OFDM symbol generated based on 64-FFT (64 subcarriers) in each 20 MHz channel.

Meanwhile, it is proposed that the HE-Part includes two signaling fields. In addition, it is assumed that a first signaling field (hereinafter referred to as 'SIG 1' or 'SIG A') carries common control information and a second signaling field (hereinafter referred to as 'SIG 2' or 'SIG B') provides information necessary for data transmission.

The HE-SIG A may provide common control information, which will be commonly applied to STAs receiving the corresponding PPDU. The HE-SIG A may be transmitted in two or three OFDM symbols. Table 2 shows information included in the HE-SIG A.

TABLE 2

| FIELD | BIT NUMBER | DESCRIPTION |
| --- | --- | --- |
| Bandwidth | 2 | Indicating a bandwidth in which a PPDU is transmitted. For example, 20 MHz, 40 MHz, 80 MHz or 160 MHz |
| Group ID | 6 | Indicating an STA or a group of STAs that will receive a PPDU |
| Stream information | 12 | Indicating the number or location of spatial streams for each STA, or the number or location of spatial streams for a group of STAs |
| Uplink (UL) indication | 1 | Indicating whether a PPDU is destined to an AP (uplink) or to an STA (downlink) |
| MU indication | 1 | Indicating whether a PPDU is an SU-MIMO PPDU or an MU-MIMO PPDU |
| Guard Interval (GI) indication | 1 | Indicating whether a short GI or a long GI is used |
| Allocation information | 12 | Indicating a band or a channel (subchannel index or subband index) allocated to each STA in a bandwidth in which a PPDU is transmitted |
| Transmission power | 12 | Indicating a transmission power for each channel or each STA |

The names and formats of the individual fields in Table 2 are merely exemplary and an HE-SIG A according to the present invention may have a form different from that shown in Table 2.

The HE-STF may be used to improve performance of AGC estimation in MIMO transmission and the HE-LTF may be used to estimate an MIMO channel.

An HE-SIG B may include user-specific information that is required for each STA to receive its data (i.e., a physical layer service data unit (PSDU)). For example, the HE-SIG B may include information on a length of a corresponding PSDU and an MCS level of the corresponding PSDU. Such an HE-SIG B may be transmitted in one or two OFDM symbols.

Meanwhile, each of the L-STF, L-LTF, L-SIG, and HE-SIG A may be repeatedly transmitted in a 20 MHz channel. That is, the L-STF, L-LTF, L-SIG, and HE-SIG A shown in FIG. 6 are transmitted through four channels but each of them may contain the same information.

In FIG. 6, an FFT size per unit frequency may be increased from the HE-STF (or from the HE-SIG A). For example, a 256 FFT size may be used in a 20 MHz channel, a 512 FFT size may be used in a 40 MHz channel, and a 1024 FFT size may be used in an 80 MHz channel. If an FFT size is increased, the number of OFDM subcarriers per unit frequency is increased. This is because a spacing between OFDM subcarriers is reduced but an OFDM symbol time is increased. To improve efficiency, a guard interval (GI) after the HE-STF may be configured to be the same as that after the HE-SIG A.

Figure 7:
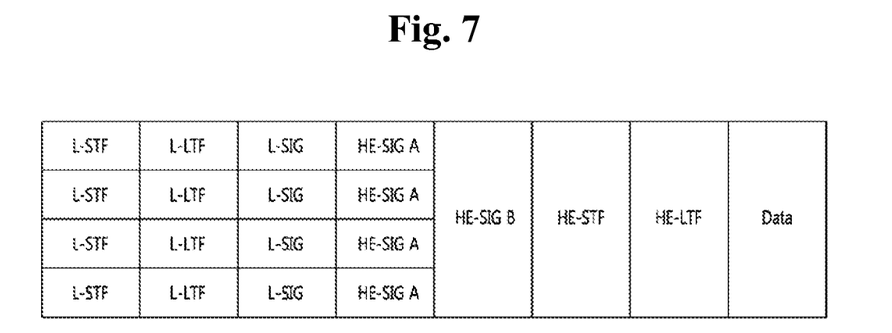
FIGS. 7 to 9 are diagrams for explaining frame configuration methods according to different embodiments of the present invention.

FIG. 7 is a diagram for explaining a frame configuration method according to another embodiment of the present invention.

FIG. 7 is identical to FIG. 6, except that the HE-SIG B is placed immediately after the HE-SIG A. The FFT size per unit frequency may be increased after the HE-STF (or the HE-SIG B).

Figure 8:
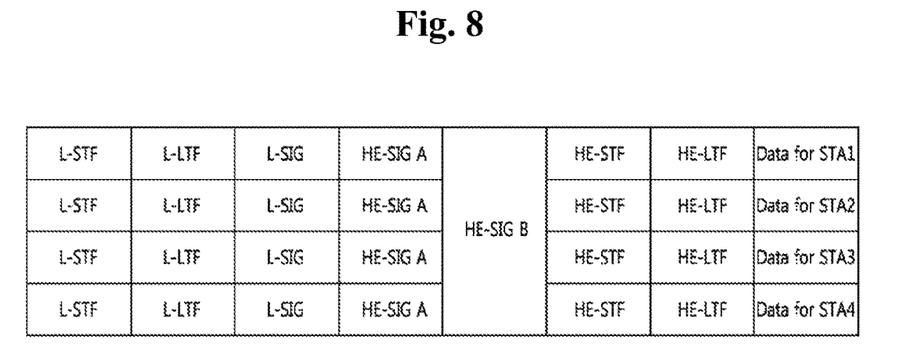

FIG. 8 is a diagram for explaining a frame configuration method according to a further embodiment of the present invention.

Similar to FIG. 7, FIG. 8 shows an example in which the HE-SIG B is placed immediately after the HE-SIG A. In FIG. 8, it can be seen that 20 MHz channels are allocated to different STAs, for example, STA 1 to STA 4 and then data is transmitted.

In the example of FIG. 8, although it is assumed that the HE-SIG B includes information necessary for each STA to receive data as described above, the HE-SIG B is encoded over an entire band. That is, the HE-SIG B may be received by all the STAs. The FFT size per unit frequency may be increased after the HE-STF (or the HE-SIG B).

Figure 9:
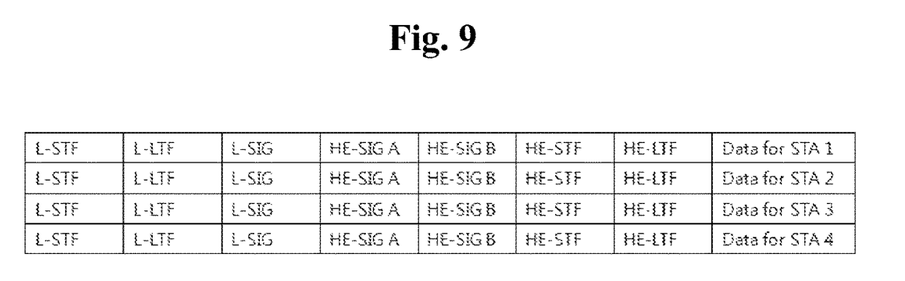

FIG. 9 is a diagram for explaining a frame configuration method according to still a further embodiment of the present invention.

Similar to FIG. 8, FIG. 9 shows an example in which the HE-SIG B is placed immediately after the HE-SIG A. However, in the example of FIG. 9, the HE-SIG B is separately transmitted in each 20 MHz channel. In this way, the structure shown in FIG. 7 can also be changed such that the HE-SIG B is transmitted in each 20 MHz channel. If the FFT size is increased, an STA that supports conventional IEEE 802.11a/g/n/ac cannot decode a corresponding PPDU. For coexistence between a legacy STA and an HE STA, it is proposed that even though FFT sizes of other fields are increased, each of the L-STF, L-LTF, and L-SIG are transmitted with a 64 FFT size in a 20 MHz channel. For instance, the L-SIG may be transmitted in a single OFDM symbol, an interval for the single OFDM symbol may be 4 um, and a GI may be 0.8 um.

The HE-SIG A includes information necessary for the HE STA to receive an HE PPDU. However, the HE-SIG A may be transmitted with a 64 FFT size in a 20 MHz channel so that it can be received by both of the legacy STA and the HE STA. This is because to allow the HE STA to receive not only the HE PPDU but also conventional HT/VHT PPDUs. To this end, a method for enabling a legacy STA and an HE STA to distinguish between an HE PPDU and an HT/VHT PPDU is required.

Figure 10:
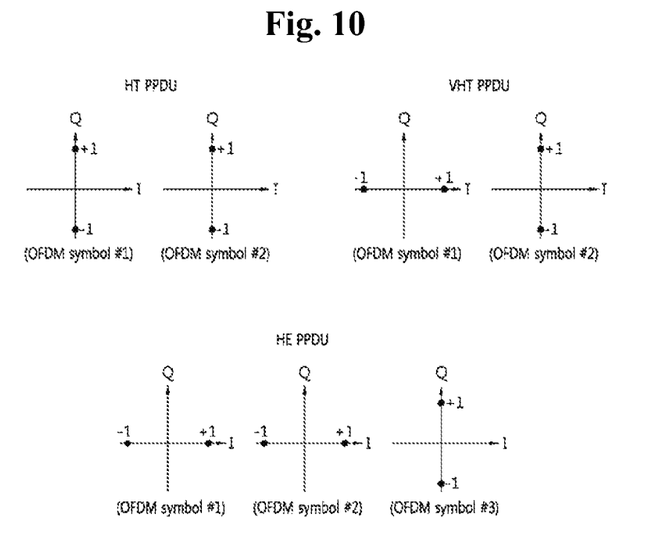
FIG. 10 is a diagram for explaining a method for distinguishing between an HE PPDU and a legacy PPDU according to an embodiment of the present invention.

FIG. 10 is a diagram for explaining a method for distinguishing between an HE PPDU and a legacy PPDU according to an embodiment of the present invention.

Specifically, FIG. 10 illustrates an example of a method for distinguishing between PPDUs using phase rotation. That is, for classification of PPDUs, constellation phases of OFDM symbols after the L-STF, L-LTF, and L-SIG may be rotated and transmitted as show in FIG. 10.

In the case of the HE PPDU illustrated in the example of FIG. 10, phases of three OFDM symbols after the L-SIG are rotated. The phases of OFDM symbol #1 and OFDM symbol #2 are not rotated but the phase of the OFDM symbol #3 may be counterclockwise rotated by 90 degrees and then transmitted. BPSK modulation may be applied to the OFDM symbol #1 and the OFDM symbol #2 and QBPSK modulation may be applied to the OFDM symbol #3.

If the HE-SIG A is transmitted in three OFDM symbols after the L-SIG, it is possible to consider that all the three OFDM symbols are used to transmit the HE-SIG A.

Meanwhile, HE STAs in accordance with the 11ax should receive both of the aforementioned HE-SIG A and HE-SIG B to receive data. In the case of the HE-SIG B, since as the number of symbols increases, performance of FER decreases (1%), the HE-SIG B may act as a bottleneck in data reception performance. That is, since only a single CRC is used in the HE-SIG B when a large amount of data is transmitted, reception performance may be degraded. Therefore, a more robust transmission method is required.

In the conventional Wi-Fi system, the lowest MCS level, i.e., MCS 0 (BPSK ½) is used for SIG transmission. However, in an embodiment of the present invention, it is proposed to configure and support an MCS level, which will be used to transmit the HE-SIG B, lower than the MCS 0. For instance, BPSK (¼, ½), QPSK (½, ¾), and the like may be used as the MCS level, which will be applied to the HE-SIG B transmission. That is, the MCS level for the HE-SIG B may be set to be higher or lower than the MCS 0. However, since an MCS level lower than the MCS 0 can be supported, more robust transmission is expected.

In addition, according to an embodiment of the present invention, the HE-SIG A may be configured to carry information on the MCS level used for the HE-SIG B transmission. In this case, even when the MCS level applied to the HE-SIG B is lower than the conventional MCS level 0, it is preferred that the HE-SIG A is previously configured to carry the MCS level.

Meanwhile, the MCS level applied to the HE-SIG B may be preferably determined in consideration of an MCS level applied to data. Considering that the HE-SIG B includes data necessary for data reception as described above, if an STA that intends to receive the corresponding data successfully receives the HE-SIG B, there may be no problem. Thus, when the MCS level applied to the data is relatively high, it is not necessary to decrease the MCS level applied to the HE-SIG B to the MCS 0. However, to improve transmission reliability of the HE-SIG B, the MCS level applied to the HE-SIG B may be preferably set to be equal to or lower than the MCS level applied to the data.

According to another embodiment of the present invention, to improve transmission reliability of the HE-SIG A, the HE-SIG A may also be configured to support an MCS lower than the MCS 0. For instance, an MCS level applied to HE-SIG A transmission may be set as BPSK (¼). This is because since common control information for packet transmission is transmitted through the HE-SIG A, the HE-SIG A needs to have high transmission reliability not only in an indoor environment but also in an outdoor environment.

To support the MCS lower than the MCS 0 as described above, the HE-SIG A/B may be configured to be repeatedly transmitted. Hereinafter, the repeated HE-SIG A/B transmission will be described in detail.

Figure 11:
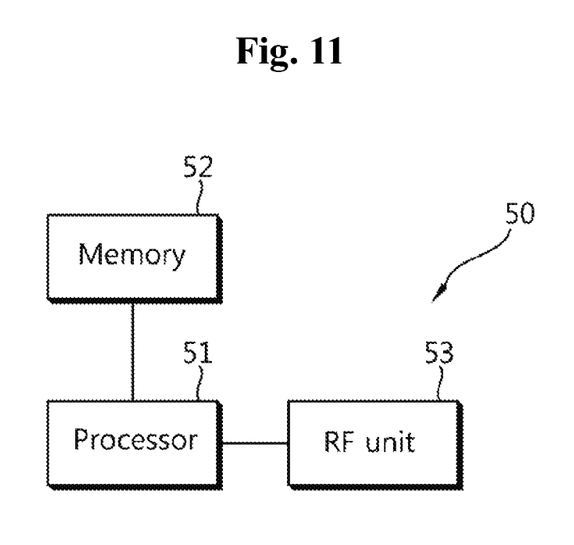
FIGS. 11 to 13 are diagrams for explaining station devices according one aspect of the present invention.
Figure 12:
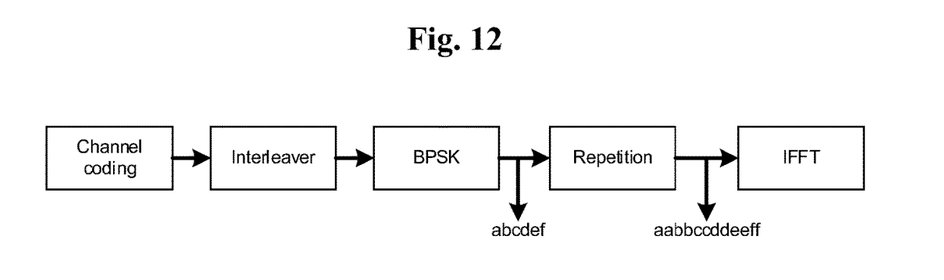
Figure 13:
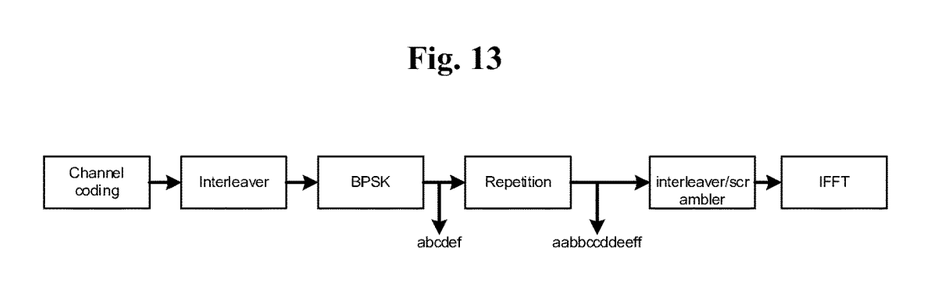

FIGS. 11 to 13 are diagrams for explaining station devices according one aspect of the present invention.

In FIG. 11, a wireless device 50 may correspond to STA1 that transmits a frame or STA2 that receives a frame. Either or both of the STA1 and the STA2 may correspond to an AP.

The STA1 50 may include a processor 51, a memory 52, and a radio frequency (RF) unit 53 (i.e., transmitting and receiving unit). The RF unit 53 may include a transmitter for frame transmission and a receiver for frame reception.

In FIG. 11, the processor 50 may be configured to perform the same operation as that described later in FIGS. 12 and 13.

Referring to FIG. 12, the processor 50 may include a channel coder, an interleaver, a modulator and an IFFT module. In addition, it is proposed that the processor additionally includes a repeater to allow the HE-SIG A and/or the HE-SIG B to support the MCS lower than the MCS 0 as described above.

As an embodiment, in the case of the HE-SIG A and/or the HE-SIG B, signals are configured using the MCS 0 (i.e., BPSK ½) identical to that used in the L-SIG. In addition, the configured signals may be repeatedly transmitted in the course of repetition.

The signal repetition may be performed such that an entire signal is repeated or some bits of a signal modulated by the modulator are repeated. For example, assuming that a signal generated by passing BPSK ½ and a bit interleaver is abcdef . . . as shown in FIG. 12, a signal repeated by the repeater may be determined as aabbccddeeff . . . . In this case, a repetition factor N is assumed to be 2.

Meanwhile, the signal repetition may be performed in unit of n bits where n may be one of 1, 2, 3, 4, 6, 8, 12, and 24. For instance, in case of n=4, assuming that a signal is abcdefgh . . . , a repeated signal may be determined as abcdabcdefghefgh . . . .

The number of times of repetition may be set to be equal to or greater than 2 to improve performance of the HE-SIG A and/or B. When the repetition factor is 2, the HE-SIG A/B may have the same effect as that when a signal is transmitted using BPSK ¼ after repeating the signal once.

On the other hand, unlike FIG. 12, the repetition may be performed before the interleaver, that is, immediately after coding is performed by the channel coder.

Further, to improve performance of the aforementioned repeated signal, an additional interleaver/scrambler may be included as shown in FIG. 12.

In the OFDMA, the repeatedly loaded information mentioned in the foregoing description may be transmitted through a basic tone unit (BTU) or a combination of BTUs, which has an allocation size similar to that where the HE-SIG A/B signal is loaded, to guarantee its reception performance. In other words, the information may be transmitted using a combination of small allocation sizes or a similar allocation size. For instance, the HE-SIG A may be transmitted using the 1× symbol (64-FFT). In this case, it may be transmitted using 52 tones including four pilots. In addition, in this case, if two BTUs (e.g., 26 tones, 56 tones, etc.) are used to support the OFDMA, data/packets may be transmitted using a 2*26-tone BTU or a 56-tone BTU.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the present invention is described on the assumption that the invention is applied to the WLAN system based on IEEE 802.11, the invention is not limited thereto. The present invention can be identically applied to various wireless systems.

What is claimed is:

1. A method for transmitting a radio frame by a second type station (STA) in a wireless local area network (WLAN) system, the method comprising:
configuring the radio frame including a first part for a first type STA and a second part for the second type STA,
wherein the second part comprises a first signaling field; and
and a second signaling field
transmitting the configured radio frame via a bandwidth equal to or greater than 80 MHz,
wherein configuring the radio frame comprises:
processing information for at least one of the first signaling field or the second signaling field for a first 20 MHz of the bandwidth; and
duplicating the information processed for the first 20 MHz into a second 20 MHz within the bandwidth,
wherein processing the information comprises:
encoding and modulating the information according to a lowest MCS (Modulation and Coding Scheme) level among available MCS levels,
wherein the lowest MCS is used for BPSK (Binary Phase Shift Keying) with a ½ coding rate; and
repeating the information in a unit of N bits,
wherein N is integer greater than 1.

2. The method of claim 1,
wherein the first signaling field provides common control information and
wherein the second signaling field provides user-specific control information required for data transmission.

3. The method of claim 1,
wherein the second type STA is a terminal that supports communication schemes in accordance with IEEE 802.11ax standards and
wherein the first type STA is a legacy terminal in view of the second type STA.

4. The method of claim 1, wherein the processing information comprises:
encoding the information at the ½ coding rate;
interleaving the encoded information;
modulating and repeating the interleaved information by BPSK and by 2 or more times; and
transforming the repeated information into a transmission signal for at least one of the first signaling field or the second signaling field of the radio frame.

5. The method of claim 1, wherein an available MCS level higher than the lowest MCS comprises one of: BPSK with a ¼ coding rate, QPSK with a ¼ coding rate, or QPSK with a ¼ coding rate.

6. A device operating as a second type station (STA) in a wireless local area network (WLAN) system, the device comprising:
a processor configured to configure a radio frame including a first part for a first type STA and a second part for the second type STA,
wherein the second part comprises a first signaling field and a second signaling field; and
a transmitter configured to transmit the radio frame via a bandwidth equal to or greater than 80 MHz,
wherein the processor configures the radio frame by:
processing information for at least one of the first signaling field or the second signaling field for a first 20 MHz of the bandwidth; and duplicating the information processed for the first 20 MHz into a second 20 MHz within the bandwidth, wherein the processor processes the information by:
encoding and modulating the information according to a lowest MCS (Modulation and Coding Scheme) level among available MCS levels,
wherein the lowest MCS is used for BPSK (Binary Phase Shift Keying) with a ½ coding rate; and
repeating the information in a unit of N bits,
wherein N is integer greater than 1.

7. The device of claim 6,
wherein the processor configures the first signaling field to provide common control information, and
wherein the processor configures the second signaling field to provide user-specific control information required for data transmission.

8. The device of claim 6,
wherein the second type STA is a terminal that supports communication schemes in accordance with IEEE 802.11ax standards, and
wherein the first type STA is a legacy terminal in view of the second type STA.

9. The device of claim 6, wherein the processor comprises:
an encoder for encoding the information at the ½ coding rate;
an interleaver for interleaving the encoded information;
a modulation mapper for modulating and repeating the interleaved information by BPSK and by 2 or more times; and
a transformer for transforming the repeated information into a transmission signal for at least one of the first signaling field or the second signaling field of the radio frame.

10. The device of claim 6, wherein an available MCS level higher than the lowest MCS comprises one of: BPSK with a ¼ coding rate, QPSK with a ¼ coding rate, or QPSK with a ¼ coding rate.

* * * * *

UNITED STATES PATENT AND TRADEMARK OFFICE
CERTIFICATE OF CORRECTION

| | | |
|---|---|---|
| PATENT NO. | : 10,257,837 B2 | Page 1 of 1 |
| APPLICATION NO. | : 15/508877 | |
| DATED | : April 9, 2019 | |
| INVENTOR(S) | : Dongguk Lim et al. | |

It is certified that error appears in the above-identified patent and that said Letters Patent is hereby corrected as shown below:

In the Claims

In Column 10, Lines 11, 12 and 13:
Delete "wherein the second part comprises a first signaling field; and and a second signaling field" and insert --wherein the second part comprises a first signaling field and a second signaling field; and--

Signed and Sealed this
Fourteenth Day of February, 2023

Katherine Kelly Vidal

Katherine Kelly Vidal
*Director of the United States Patent and Trademark Office*